Patented Dec. 28, 1926.

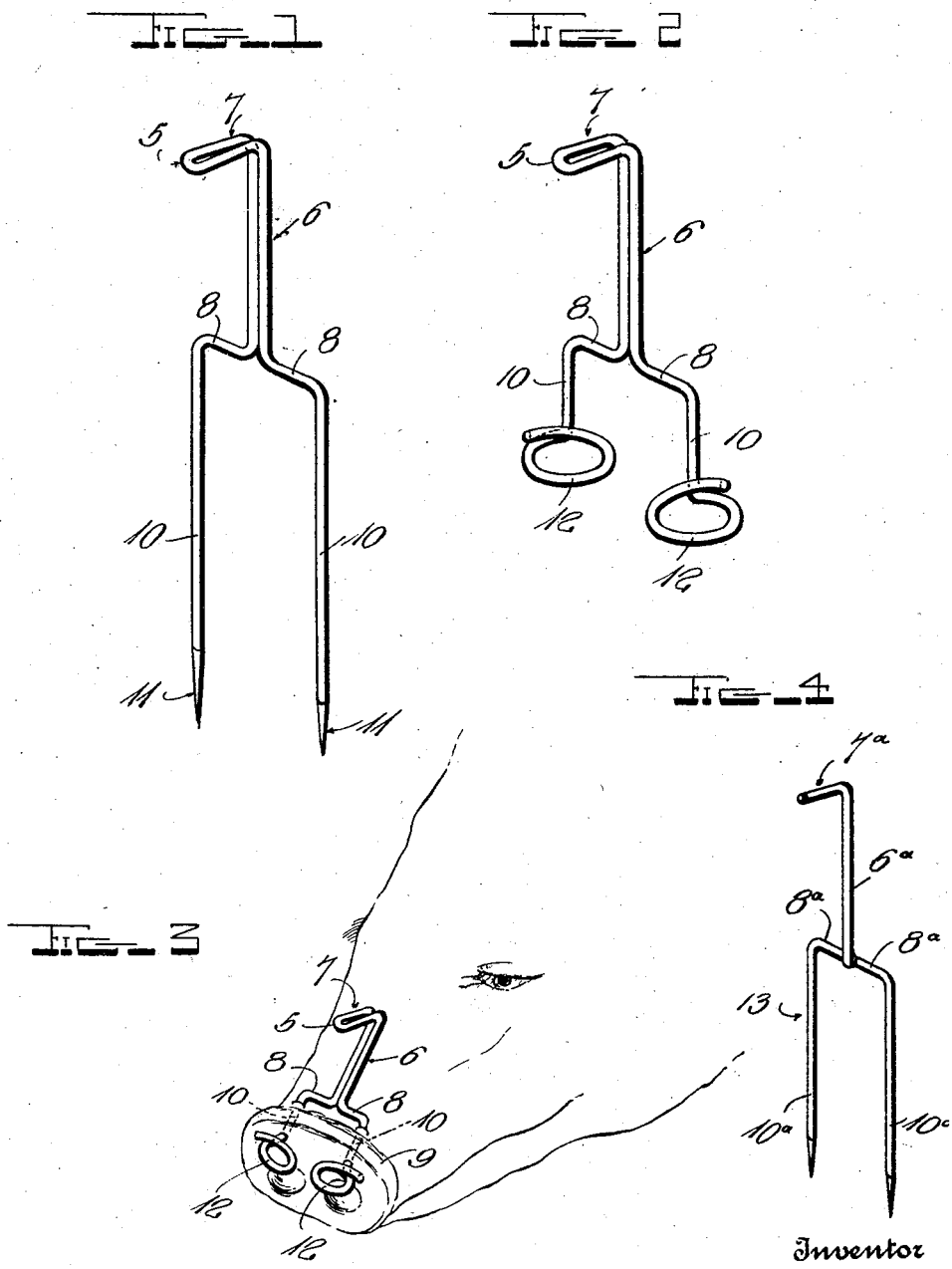

1,612,272

UNITED STATES PATENT OFFICE.

SANTINO FALLINI, OF NOVINGER, MISSOURI.

ANTIROOTER.

Application filed June 24, 1926. Serial No. 118,341.

The invention relates to improvements in devices to prevent hogs from rooting, and aims to provide a device of this character which, although being exceptionally simple and inexpensive, will be highly efficient and may be quickly and easily applied.

With the foregoing in view, the invention resides in the novel subject matter hereinafter described and claimed, the description being supplemented by the accompanying drawing.

Figure 1 is a perspective view showing one form of the device, as manufactured and placed on sale.

Figure 2 is a perspective view illustrating the manner in which the stops are formed to prevent disconnection of the device from the hog's snout.

Figure 3 is a perspective view showing the device applied.

Figure 4 is a perspective view showing a modified form of construction.

In constructing the form of the device shown in Figs. 1, 2 and 3, I make use of a single length of wire. This wire is bent upon itself at its center, as indicated at 5, and substantially the inner halves of the two reaches of this wire are disposed in contact with each other to form a shank 6 for disposition in front of a hog's face, said shank having the bend 5 at its upper end and having the latter bent forwardly as at 7. The two reaches of the wire are bent horizontally outward in opposite directions at the lower end of the shank 6, providing a pair of stop arms 8 which are adapted to rest upon the hog's snout, behind the cartilage ridge 9 thereof. At the outer ends of these stop arms 8, the two wire reaches are bent downwardly, providing prongs 10 for downward and forward forcing through the cartilage ridge. After forcing the prongs 10 through this ridge, their sharp extremities 11 are cut off and the arms are bent to provide loops 12 or other adequate stops which prevent withdrawal of the prongs.

In Fig. 4, a construction is shown in which a shank 6ª having a forwardly projecting upper end 7ª, is welded or otherwise integrally connected with the crown portion of an arched wire member 13, the ends of said crown portion forming stops 8ª having the same function as the stops 8. The parallel arms of the member 13 form prongs 10ª having the same function as the prongs 10.

It will be seen from the foregoing that the device may be easily and inexpensively manufactured and hence sold at small cost, that it may be quickly and easily applied, and that its use will effectively prevent hogs from rooting or from nosing their way under fences and other objects. The fence may be set up a few inches above the ground to prevent rotting and even then there is no danger of hogs nosing their way under the fence. Moreover, the device will prevent the hogs from forcing their way through a fence even though the latter is formed of light rather than heavy wire, and there is no need of using barb wire at the bottom of the fence. Attention is further directed to the fact that the invention may be easily applied with an ordinary pair of pliers, rather than requiring a special tool.

I claim:

1. An anti-rooter comprising a shank for disposition in front of a hog's face, stop arms projecting laterally in opposite directions from and integral with the lower end of said shank, said stop arms being adapted to rest on the hog's snout behind the cartilage ridge thereof, and a pair of attaching prongs integral with the outer ends of said stop arms and projecting downwardly therefrom, said prongs being adapted for downward and forward forcing through the cartilage ridge and being bendable, permitting the formation of withdrawal-preventing stops by bending the prongs after passage thereof through the above-named cartilage ridge.

2. An anti-rooter comprising a single length of wire bent upon itself at its center, the two reaches of the wire having substantially their inner halves disposed in contact with each other to provide a shank for disposition in front of a hog's face, said shank having the bend of the wire at its upper end and having the latter bent forwardly, said reaches being bent laterally in opposite directions at the lower end of said shank to form a pair of stop arms adapted to rest on the hog's snout behind the cartilage ridge thereof, said reaches being downwardly bent at the outer ends of said stop arms to provide attaching prongs, said prongs being adapted for downward and forward forcing through the cartilage ridge and being bendable permitting the formation of withdrawal-preventing stops by bending the prongs after passage thereof through the above-named cartilage ridge.

In testimony whereof I have hereunto affixed my signature.

SANTINO FALLINI.